United States Patent
Altamura et al.

(10) Patent No.: US 10,655,829 B2
(45) Date of Patent: May 19, 2020

(54) DECORATIVE LIGHTING APPARATUS

(71) Applicant: Seasonal Specialties, LLC, Eden Prairie, MN (US)

(72) Inventors: Steven J. Altamura, Scarsdale, NY (US); Chen Pengcheng, Yingtan (CN)

(73) Assignee: Seasonal Specialties, LLC, Eden Prairie, MN (US)

( * ) Notice: Subject to any disclaimer, the term of this patent is extended or adjusted under 35 U.S.C. 154(b) by 0 days.

(21) Appl. No.: 16/123,353

(22) Filed: Sep. 6, 2018

(65) Prior Publication Data

US 2019/0078768 A1    Mar. 14, 2019

Related U.S. Application Data

(60) Provisional application No. 62/555,802, filed on Sep. 8, 2017.

(51) Int. Cl.
| | |
|---|---|
| *F21V 23/00* | (2015.01) |
| *F21S 10/06* | (2006.01) |
| *F21V 5/04* | (2006.01) |
| *G02B 27/09* | (2006.01) |
| *F21V 21/08* | (2006.01) |
| *F21Y 115/10* | (2016.01) |
| *F21Y 103/33* | (2016.01) |

(52) U.S. Cl.
CPC .......... *F21V 23/007* (2013.01); *F21S 10/063* (2013.01); *F21V 5/04* (2013.01); *F21V 21/0824* (2013.01); *F21V 23/003* (2013.01); *G02B 27/0955* (2013.01); *F21Y 2103/33* (2016.08); *F21Y 2115/10* (2016.08)

(58) Field of Classification Search
None
See application file for complete search history.

(56) References Cited

U.S. PATENT DOCUMENTS

| | | |
|---|---|---|
| 9,068,726 B2 | 6/2015 | Zhang |
| 2016/0026073 A1* | 1/2016 | Zhang .................. G03B 21/142 353/101 |
| 2017/0082254 A1 | 6/2017 | Zhang |
| 2017/0219176 A1 | 8/2017 | Chang |
| 2017/0227200 A1 | 8/2017 | Zhang et al. |
| 2017/0241623 A1 | 8/2017 | Zhang |

* cited by examiner

*Primary Examiner* — Elmito Breval
(74) *Attorney, Agent, or Firm* — Hamre, Schumann, Mueller & Larson, P.C.

(57) ABSTRACT

A decorative light apparatus has a housing 12, a dome 20, a power supply, a motor 30, a light board 36 having LEDs 46 surrounding the motor, a multi-surface refractive lens and a beam-splitter lens light shade. The light disk 36 supports the motor 30 directly so that alignment of the LEDs, lens and motor are always correct. The motor may further transmit vibrations into the light board which can provide a slight shimmering effect of the light passing through the lens.

13 Claims, 10 Drawing Sheets

DECORATIVE LIGHTING APPARATUS

PRIORITY DATA

This patent application is a non-provisional application claiming priority to U.S. Provisional Patent application No. 62/555,802, filed Sep. 8, 2017 entitled Decorative Lighting Apparatus, which is hereby incorporated by reference in its entirety.

BACKGROUND OF THE DISCLOSURE

Field of the Disclosure

The present disclosure is directed to decorative lighting devices and methods, particularly used for decoration and entertainment.

Description of the Related Art

Decorative lighting has as its primary function to decorate and/or entertain. Workspace illumination is a secondary function. Holiday lighting is a subset of decorative lighting and it is characterized by products which can be mass produced at very low cost. Light strings are a good example. These are very inexpensive articles and are often used for only one season. Thus a successful product must provide decorative illumination but do so at the lowest cost possible.

An example of such lighting is found in U.S. Pat. No. 9,458,994 to Kulhbani, which uses lasers and diffraction grating to obtain special lighting effects. Another concept is shown in U.S. Pat. No. 9,068,726 to Zang and uses LEDs as their lighting method, which is incorporated herewith in its entirety for background.

The laser systems are expensive to construct, and uses expensive components, which is a serious disadvantage in a marketplace which prefers lower priced decorations. There is a long felt need in the marketplace for dazzling decorative lighting which can still be produced at the lowest possible cost.

A method of manufacture is also disclosed.

The present disclosure in it various embodiments overcomes these problems.

BRIEF SUMMARY

The disclosure encompasses many embodiments. One such embodiment is detailed below in summary fashion. Please understand that this summary does not encompass the entire disclosure but is provided to assist the reader in reviewing the entire disclosure and claims which also constitute part of the disclosure.

There is disclosed a decorative lighting apparatus which has any or all of the following elements:
 a. a housing;
 b. a drive motor with a shaft;
 c. a diffraction or other light altering wheel placed on the shaft for rotation a point distant from the motor;
 d. an illumination plate which may include an aperture, for mounting of the motor and a plurality of light emitting elements, such as LEDs around circumferentially around the motor;
 e. a controller for activating the motor shaft and hence rotating the wheel and for controlling the illumination of the plurality of LEDs as a group or individually.

In addition, the control of the LEDs may be controlled by frequency of illumination and color of illumination or both and can be synchronized with wheel movement to create a plurality of patterns and colors.

Also disclosed is a decorative lighting apparatus having any or all of the following:
 a. a housing having a central axis and a circular portion having a distal peripheral edge;
 b. a drive motor with a shaft, the shaft being off the central axis;
 c. a drive gear attached to said shaft; the drive gear having outer peripheral teeth located adjacent but not touching said distal peripheral edge; said teeth being positioned, at least in part beyond said distal peripheral edge;
 d. a light altering dome having an inner peripheral surface and a central axis coextensive with said housing central axis, said dome including a distal circular peripheral edge sized to mate with said housing distal peripheral edge in a slidable relationship;
 e. a ring gear of teeth on said dome peripheral surface, said ring gear capable of engaging said drive gear;
 f. a retainer bridging said housing and dome to maintain said dome peripheral edge in contact with said housing peripheral edge;
so that said dome is capable of rotating relative to said housing as said drive gear drives said ring gear.

Also disclosed is an illumination plate in said housing to project light into said dome.

Also disclosed is a plurality of LEDs around said central axis.

Also disclosed is a controller for activating the motor shaft and hence rotating the dome and for controlling the illumination of the plurality of LEDs as a group or individually.

Many other features and combinations are disclosed and claimed.

DETAILED DESCRIPTION

Figure 1:
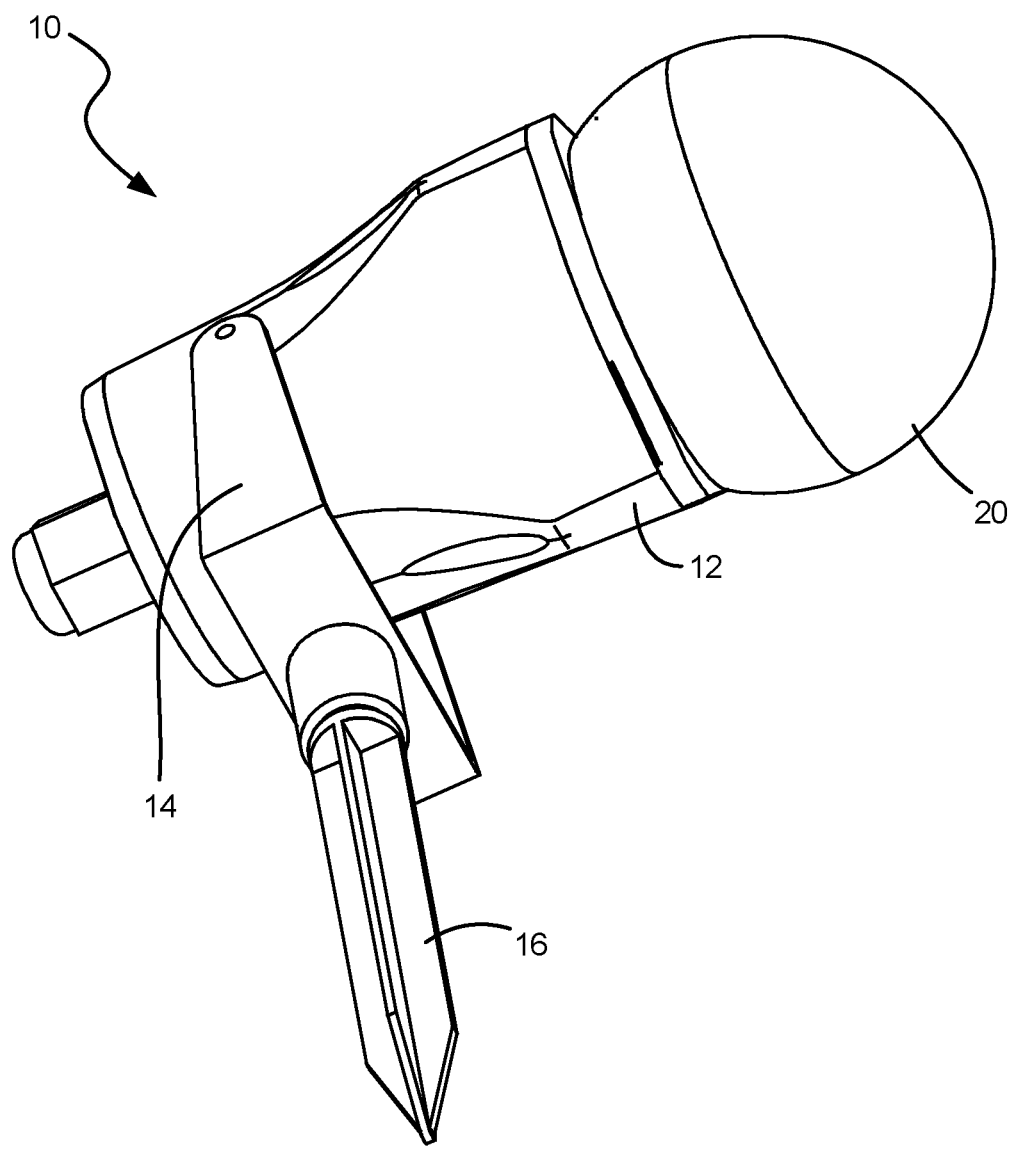
FIG. 1 is a perspective view of one embodiment of a decorative light.

FIG. 1 shows a decorative light system 10 with a housing 12, an optional pivoting mounting bracket 14 and an optional removable ground stake 16. At the distal end of the housing is a protective ball dome which is affixed thereto.

Figure 2:
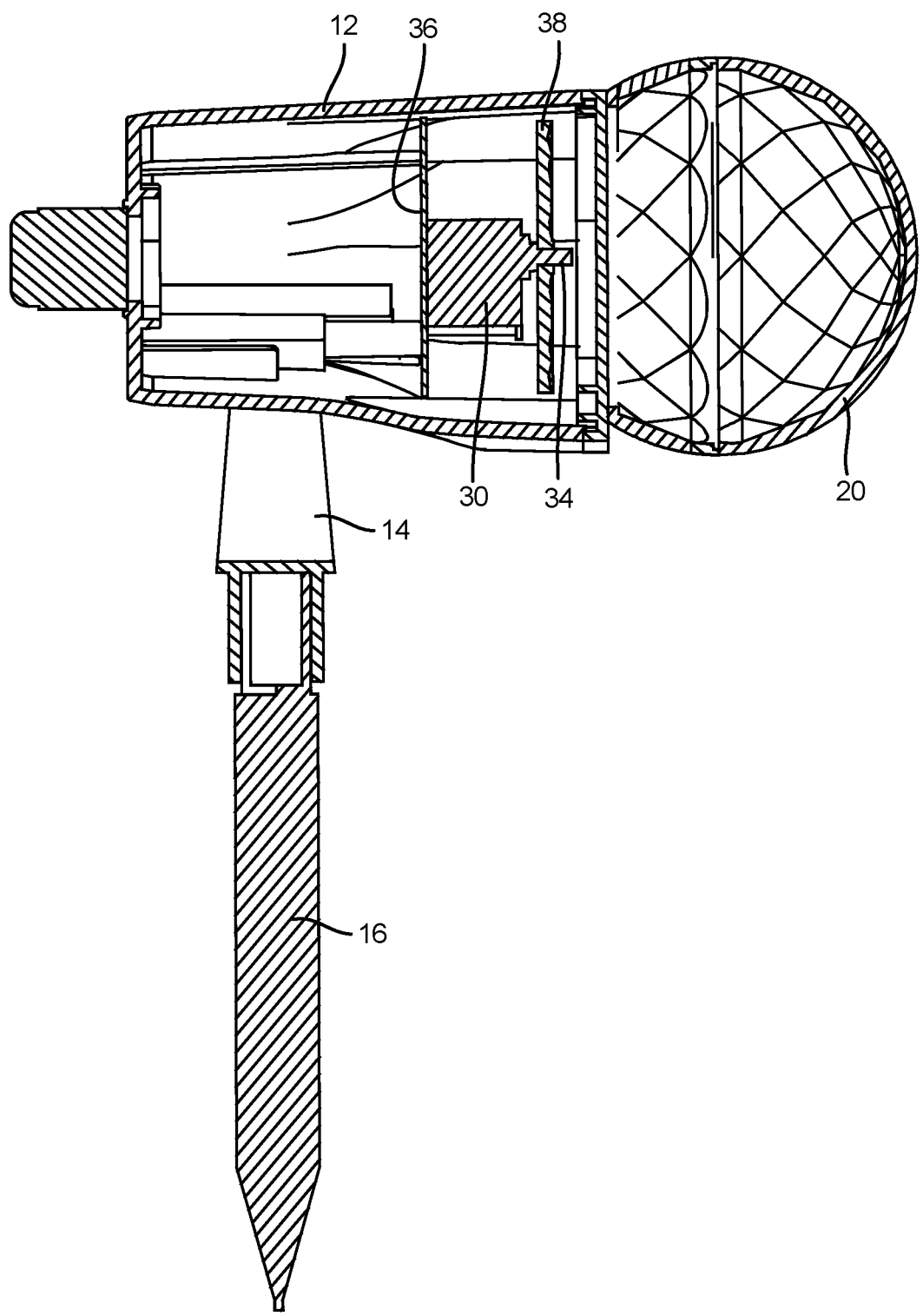
FIG. 2 is side sectional view of the light in FIG. 1 taken through the shaft.

FIG. 2 shows some of the inner construction of the light system 10.

Electric motor 30 is mounted removably in the housing. Motor shaft 34 extends orthogonally from the motor to a distal end. A light altering disk or multi-refracting lens 38 is affixed to the shaft toward the distal end. The disk may have facets on one or both faces and may also be proximal to the motor.

In this embodiment, there is a non-rotating fixed light board 36. The board has a central for mounting of the motor thereon, with a plurality of lighting elements 46 (typically LEDs concentrically surrounding the motor shaft and motor, see FIGS. 5, 6, 7). This configuration has the advantage of providing perfect alignment of the motor shaft and LEDs since they are both fixed on the board at time of manufacture.

The light altering dome 20 may be faceted or frosted in many different methods, with one such method seen in FIG. 2 to enhance light scatter or non-faceted as shown in FIG. 1.

Figure 3:
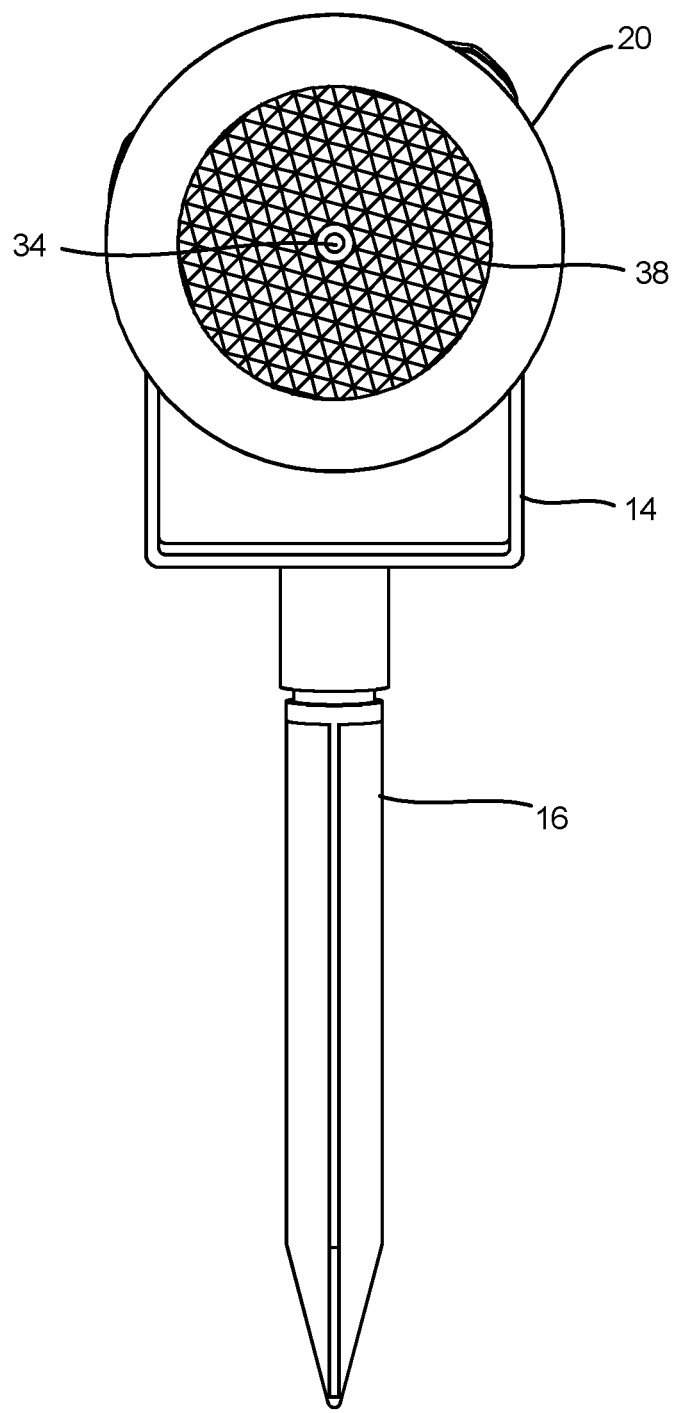
FIG. 3 is a front end view of FIG. 1.

FIG. 3 shows one possible pattern of the light altering disk 38 beneath dome 20.

Figure 4:
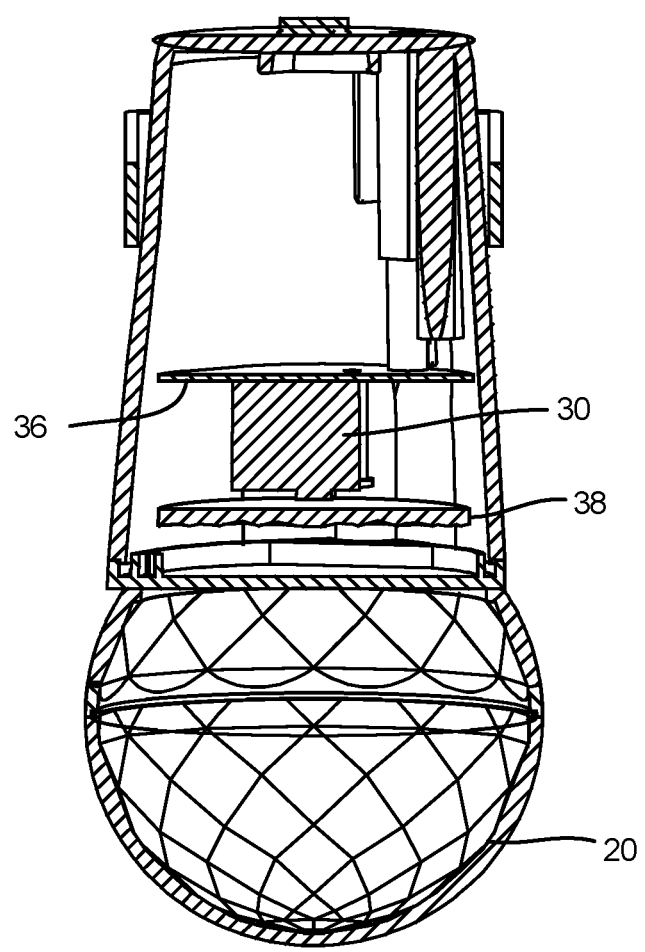
FIG. 4 is a top sectional view of FIG. 1 with parts of the top of the housing broken away.
Figure 5:
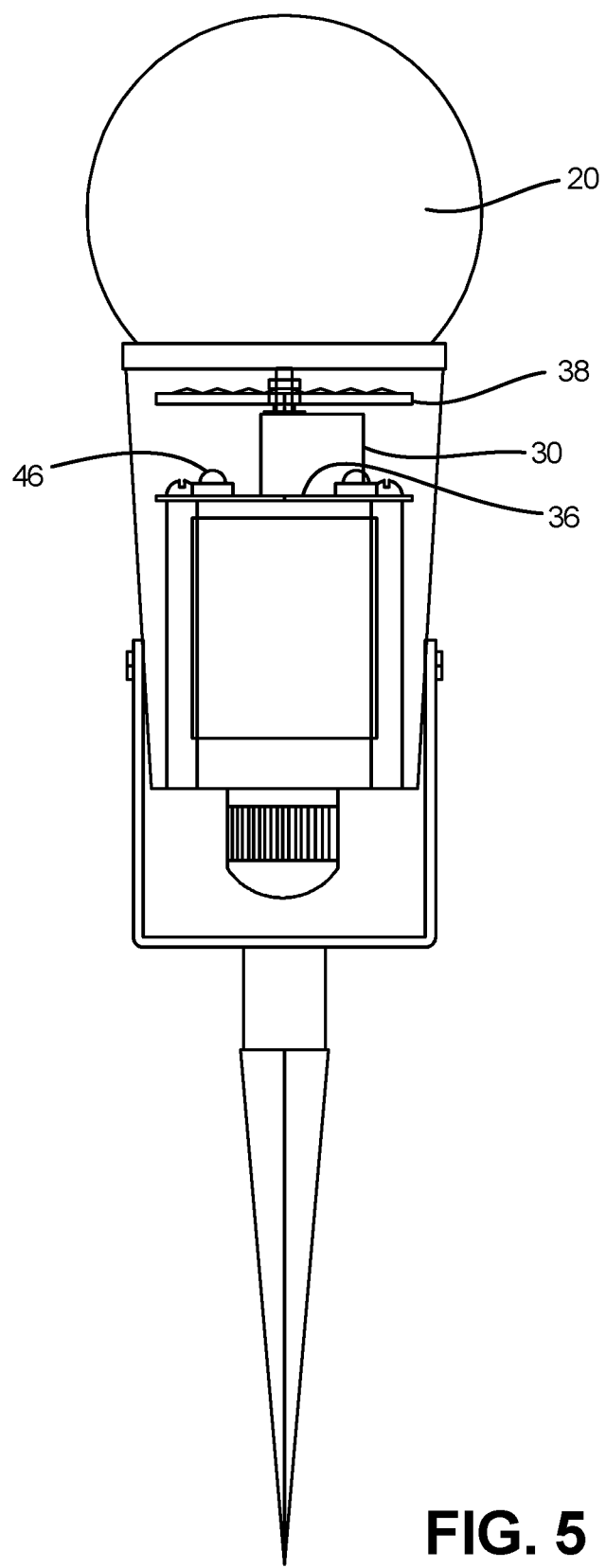
FIG. 5 is a top plan view of FIG. 1 with parts of the housing broken away.

FIGS. 4 and 5 show the housing interior from other angles.

Figure 6:
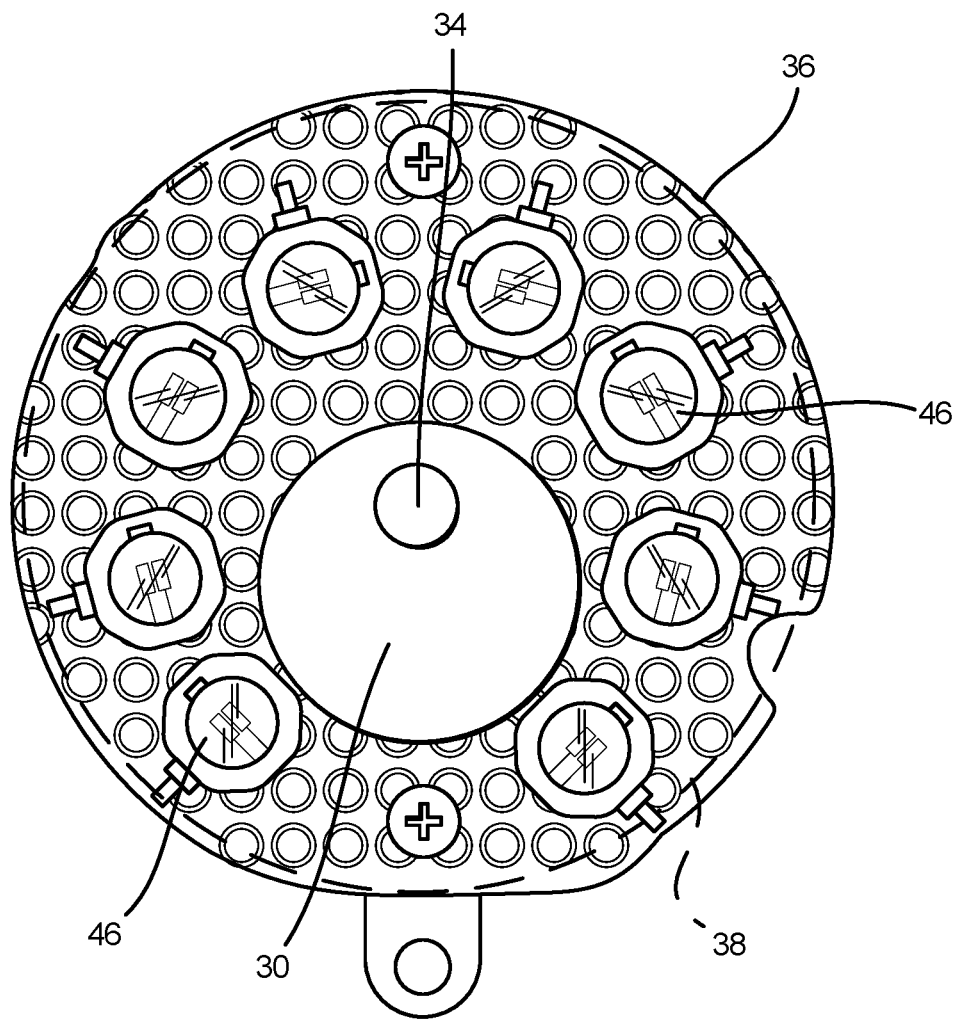
FIG. 6 is a top plan view of the LED circuit board concentric with the motor shaft.
Figure 7:
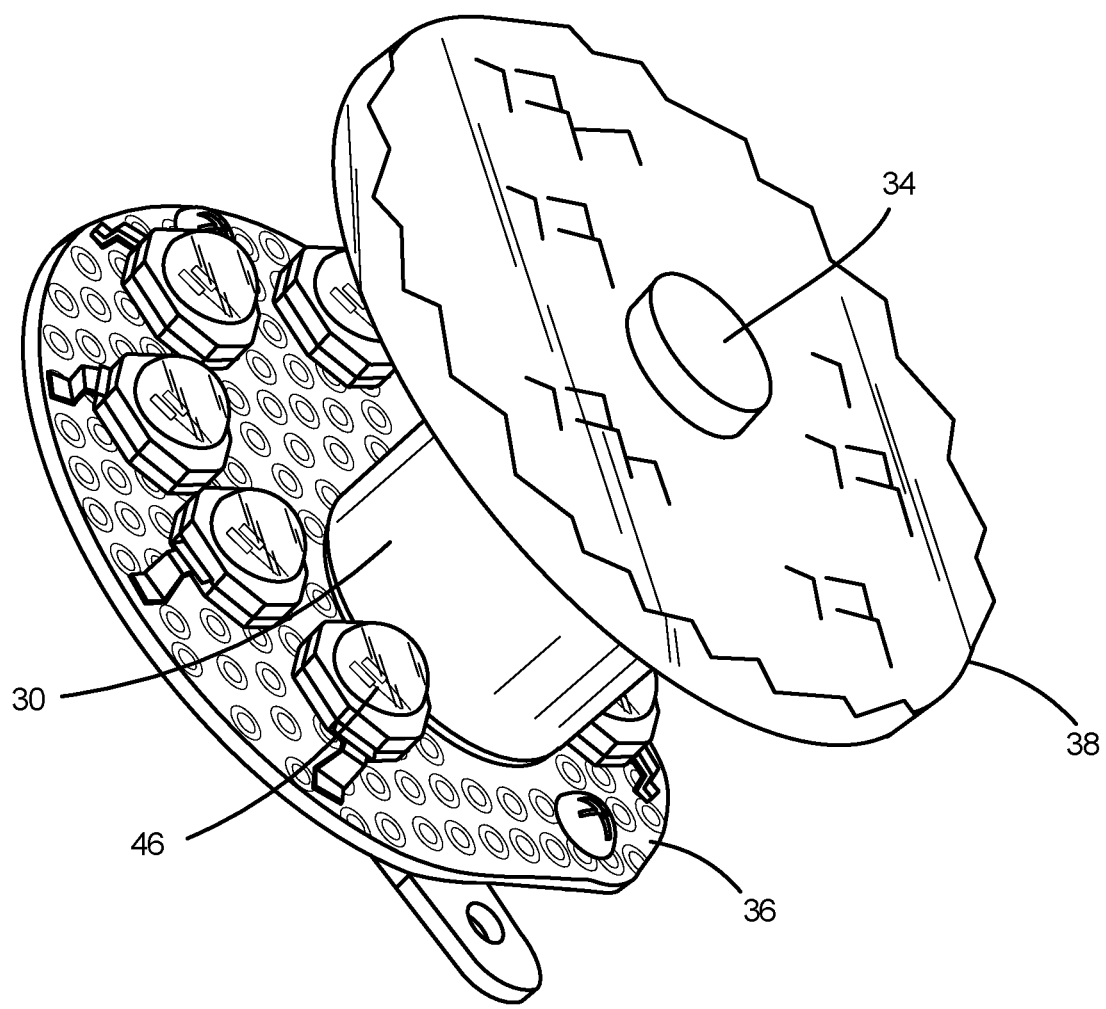
FIG. 7 is a perspective view of the motor, wheel and LED board with the housing completely removed.

FIGS. 6 and 7 show an embodiment of a light board 36 relative to the light altering disk 38 and motor 30, with FIG. 7 being an alternative embodiment.

The light board is preferably a circuit board with a plurality of LEDs 46, (discrete or chips with circuit board (PCB) mounting), arranged circumferentially, at least around the aperture 40 which allows for mounting of the motor directly thereon. FIG. 6 shows motor 30 affixed to board 36 and surrounded by LEDs 46. Shaft 34 is attached to disk 38. The number of LEDs 46 may vary based on application and light color combinations.

Because the motor is mounted directly on the light board, it is possible to create special effects from the vibration in the motor if desired. For example, the light board can be loosely mounted in the housing such as by rubber bushings so that vibrations in the motor cause are more easily transmitted to the light board. Any movement of the light board is amplified as a shimmer effect as light passes through the light altering lens (such as diffraction or prism lens). This shimmer can be further enhanced by having an unbalanced motor shaft or by using the controller to rapidly stop and start the motor or rapidly reverse motor direction.

In an alternate embodiment, the motor is eliminated entirely and the LEDs themselves are driven by a controller which illuminates the LEDs in predetermined sequences and color combinations to create interesting light patterns after the light passes through disk 38, where disk 38 can be a separate disk as shown, or can be located/mounted on the bottom of dome 20.

In a FIG. 7, the motor is positioned on the LED light board, in this case with an off center shaft, it may also be on-center.

In a further embodiment, not shown, motor 30 may be positioned in the center of the aperture 40 of light board 36 with LEDs 46 located around the aperture 40 and light altering disk 38 mounted atop shaft 34. In such case the body of the motor is straddling the light board with part above and part below the board.

An alternative version of the motor 30 is possible which has a central shaft 34 and which is centrally mounted on the board 36. In this version, there are three LEDs, which are controllable (color/intensity/pulse frequency) by the controller in the housing or elsewhere. The three LEDs can be configured to produce as much light as the eight LEDs in FIG. 6.

The motor can be a gear reduction motor (typically off set shaft) or direct drive DC stepper motor with or without gear reduction. It is also possible to combine this with a central drive motor and a set of several (for example 8) LEDs concentrically around the shaft. A stepper motor will also impart more shimmer into the LEDs due to its stop-start action at each step.

Figure 8:
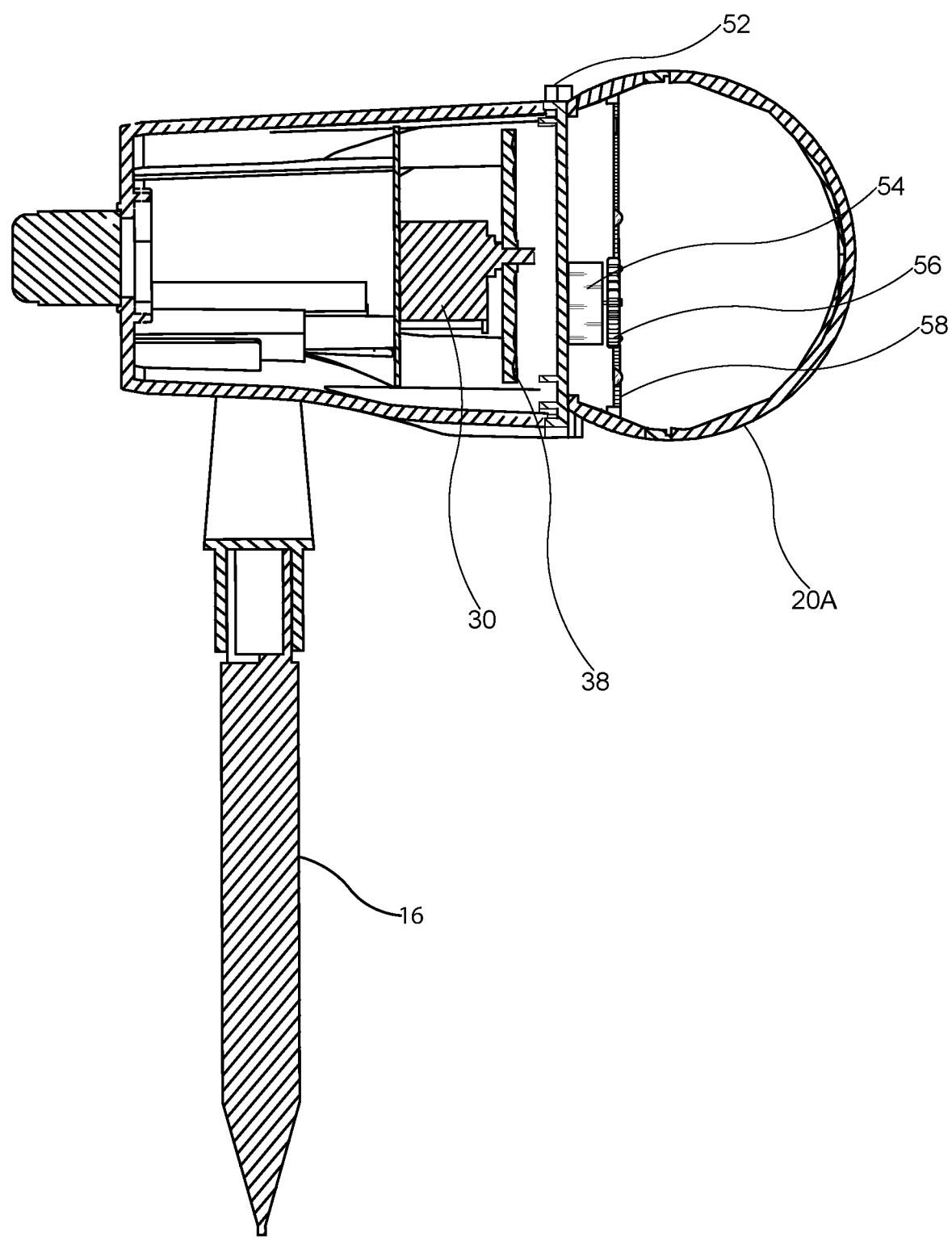
FIG. 8 is a side sectional view like FIG. 2, but of an alternate embodiment with a rotating dome, photographic top plan view of an alternate construction with a central drive motor and three LEDs.
Figure 9:
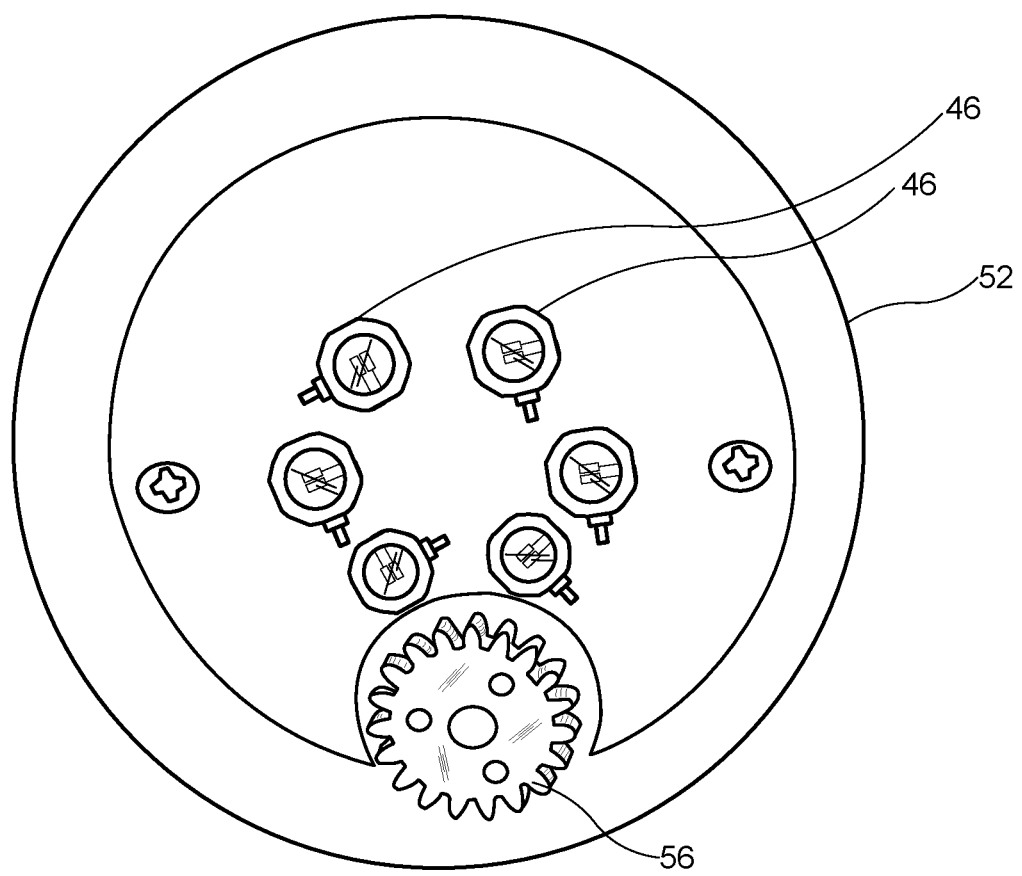
FIG. 9 shows a top view like FIG. 6, but with an off axis motor and a gear from rotating the dome 20A (FIG. 8).
Figure 10:
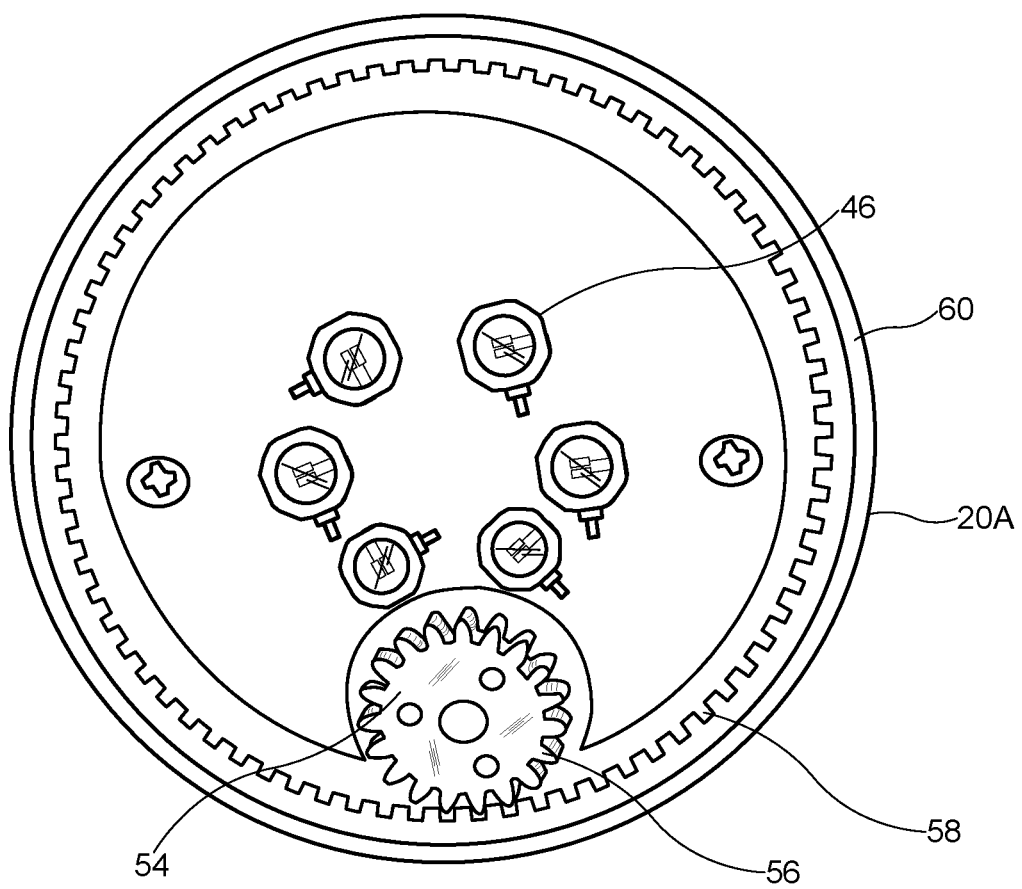
FIG. 10 is a top view of FIG. 8 taken through the dome to show the ring gear 58 on the dome engaging drive gear 54.

FIGS. 8, 9 and 10 illustrate alternate embodiments of a dome 20A which is intended to rotate to create special lighting effects.

FIG. 8 shows multiple embodiments simultaneous but in the preferred embodiment, motor 30 and lens 38 would be deleted in favor of motor 54 and faceted dome 20A.

In this embodiment, the motor 54 is offset from the central axis of the housing (which would correspond to shaft 34). In this case, the motor is close to the housing edge so that a portion of the gear 56 extends adjacent to the inner periphery of the housing. The circuit board 36 holding the LEDs is cut out in a semicircular pattern to accommodate the motor. Motor 54 includes a drive gear 56 with teeth. The dome 20A includes a ring gear on its inner periphery close to the distal edge of the dome.

In the preferred embodiment, the dome 20A has a planar flange surface 60 at its distal end. Gear teeth 58 are adjacent to the flange but on the inside of the dome. Their exact location is dictated by the requirement they can mesh with gear 56. The housing 12 also has a planar circumferential surface upon which the flange surface 60 slideably engages so that when drive motor 54 rotates gear 56, ring gear 58 is engaged and the dome rotates. Coupling 52 (FIG. 8) maintains the dome is engaged with the housing but not too tightly as to prevent the dome from rotating. The coupling can be a band which engages the planar surface or it may have a screw thread to engage a like thread on the housing or dome.

The housing shown has a stake but it could be a tapered housing terminating in an Edison light socket, or similar, so it can be screwed directly into a lamp.

The description of the invention and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:
1. A decorative lighting apparatus comprising:
   a. a housing;
   b. a drive motor with a shaft;
   c. a diffraction or other light altering wheel placed on the shaft for rotation a point distant from the motor;
   d. an illumination plate which may include an aperture, for mounting of the motor and at least one light emitting elements, such as LEDs around the motor; wherein the illumination plate is loosely mounted in the housing so that vibrations in the motor cause are more easily transmitted to the light board;
   e. a controller for activating the motor shaft and hence rotating the wheel and for controlling the illumination of the plurality of LEDs as a group or individually.

2. The apparatus of claim 1 where the illumination plate is coupled to the housing by rubber bushings so that the motor creates vibrations when operating and where in the vibrations are transmitted through the illumination plate causing a light shimmering effect.

3. The apparatus of claim 1 where the motor shaft is offset a center of the motor housing lighting elements are located circumferentially around the motor and equidistant from each other.

4. A decorative lighting apparatus comprising:
   a housing being hollow and having an opening formed in an end of the housing said housing having an inner peripheral edge;
   a supporting base connected with a bottom of the light base;
   a controller mounted in the light base;
   an illumination plate having at least one LED lights;
   a motor mounted central on the board and surrounded by said LED lights, said motor having a rotatable shaft, said shaft further including a drive gear adjacent the inner peripheral edge of the housing;
   a light altering disk lens rotatably mounted toward a distal end of said shaft, the light altering disk lens and having multiple multi-angle refractive lens bodies formed on a side of the light altering disk lens that is distal from the illumination plate; and
   a dome lens light shade rotatably and slidably mounted on the opening of the light housing and having a ring gear located adjacent the drive gear and having multiple multi-angle refractive lens bodies formed on a side of the dome lens light shade facing the light altering lens between the dome lens light shade and the opening of the light base.

5. The apparatus of claim 4 where the light altering disk includes multi-angle refractive lens formed on a side of the light altering disk lens that is proximal to the illumination plate.

6. The apparatus of claim 4 where the dome is not textured.

7. A decorative lighting apparatus comprising:
   a housing being hollow and having an opening formed in an end of the housing; said housing having an inner peripheral edge;
   a supporting base connected with a bottom of the light base;
   a controller mounted in the light base;
   an illumination plate having at least one LED lights;
   a motor mounted central on the board and surrounded by said LED lights, said motor having a rotatable shaft, said shaft further including a drive gear adjacent the inner peripheral edge of the housing;
   a light altering disk lens rotatably mounted toward a distal end of said shaft, the light altering disk lens and having multiple multi-angle refractive lens bodies formed on at least one side of the light altering disk lens that is distal from the illumination plate; and
   a dome lens light shade rotatably and slidably mounted on the opening of the light housing and having a ring gear located adjacent the drive gear and having multiple multi-angle refractive lens bodies formed on a side of the dome lens light shade facing the light altering lens between the dome lens light shade and the opening of the light base.

8. The apparatus of claim 7 where the light altering disk includes a multiple multi-angle refractive lens formed on a side of the light altering disk lens and that is proximal to the illumination plate.

9. The apparatus of claim 7 where the dome is not textured.

10. A decorative lighting apparatus comprising:
    a. a housing having a central axis and a circular portion having a distal peripheral edge;
    b. a drive motor with a shaft, the shaft being off the central axis;
    c. a drive gear attached to said shaft; the drive gear having outer peripheral teeth located adjacent but not touching said distal peripheral edge; said teeth being positioned, at least in part beyond said distal peripheral edge;
    d. a light altering dome having an inner peripheral surface and a central axis coextensive with said housing central axis, said dome including a distal circular peripheral edge sized to mate with said housing distal peripheral edge in a slidable relationship;
    e. a ring gear of teeth on said dome peripheral surface, said ring gear capable of engaging said drive gear;
    f. a retainer engaging the dome and housing and bridging said housing and dome to maintain said dome peripheral edge in contact with said housing peripheral edge so that said dome is capable of rotating relative to said housing as said drive gear drives said ring gear.

11. The apparatus of claim 10 further including an illumination plate in said housing to project light into said dome.

12. The apparatus of claim 11 further including a plurality of LEDs around said central axis.

13. The apparatus of claim 12 further including a controller for activating the motor shaft and hence rotating the dome and for controlling the illumination of the plurality of LEDs as a group or individually.

* * * * *